United States Patent [19]

Bock et al.

[11] Patent Number: 4,709,759

[45] Date of Patent: Dec. 1, 1987

[54] ENHANCED OIL RECOVERY WITH HYDROPHOBICALLY ASSOCIATING POLYMERS CONTAINING N-VINYL-PYRROLIDONE FUNCTIONALITY

[75] Inventors: Jan Bock, Bridgewater; Salvatore J. Pace, Glen Gardner; Donald N. Schulz, Annandale, all of N.J.

[73] Assignee: Exxon Research and Engineering Company, Florham Park, N.J.

[21] Appl. No.: 946,864

[22] Filed: Dec. 29, 1986

[51] Int. Cl.$^4$ .......................... C08F 20/06; E21B 43/22
[52] U.S. Cl. .................................. 166/275; 252/8.554; 526/240
[58] Field of Search ................ 166/273–275; 252/8.554; 526/240, 303.1, 307.2

[56] References Cited

U.S. PATENT DOCUMENTS

| | | | |
|---|---|---|---|
| 3,308,885 | 3/1967 | Sandiford | 166/305.1 X |
| 3,724,547 | 4/1973 | Bott | 166/275 X |
| 4,034,809 | 7/1977 | Phillips et al. | 166/270 |
| 4,323,463 | 4/1982 | Morduchowitz | 166/275 X |
| 4,395,524 | 7/1983 | Emmons et al. | 526/307.2 |
| 4,432,881 | 2/1984 | Evani | 166/275 X |
| 4,520,182 | 5/1985 | Turner et al. | 526/307.2 |
| 4,528,348 | 7/1985 | Turner et al. | 526/303.1 X |
| 4,663,408 | 5/1987 | Schulz et al. | 526/240 |

*Primary Examiner*—Stephen J. Novosad
*Attorney, Agent, or Firm*—Richard E. Nanfeldt

[57] ABSTRACT

This invention relates to a method for enhanced recovery of petroleum from a subterranean oil-bearing formation. More particularly, this invention relates to secondary or tertiary recovery of oil employing a polymer-thickened aqueous drive fluid. The polymeric viscosifier for the drive fluid is selected from a class of hydrophobically associating, water soluble polymers containing one or more water soluble monomers and a water insoluble monomer group. The water soluble groups are acrylamide and a salt of acrylic acid and the water insoluble group is a higher alkylacrylamide. These polymers, when dissolved in an aqueous brine solution, have the ability to substantially increase the viscosity of the aqueous solution. The control of displacement fluid mobility results in more uniform sweep efficiency and improved oil recovery. In addition, aqueous solutions of these hydrophobically associating polymers exhibit enhanced viscosification, reduced salt sensitivity and other desirable rheological properties found useful in chemically enhanced oil recovery processes.

10 Claims, No Drawings

ENHANCED OIL RECOVERY WITH HYDROPHOBICALLY ASSOCIATING POLYMERS CONTAINING N-VINYL-PYRROLIDONE FUNCTIONALITY

BACKGROUND OF THE INVENTION

1. Field of the Invention

This invention relates to a method for enhanced recovery of petroleum from a subterranean oil-bearing formation. More particularly, this invention relates to secondary or tertiary recovery of oil employing a polymer thickened aqueous drive fluid. The polymeric viscosifier for the drive fluid is selected from a class of hydrophobically associating water soluble polymers containing one or more water soluble monomers and a water insoluble monomer or group. The water soluble groups are acrylamide (AM) and N-vinyl pyrrolidone (NVP) and a salt of acrylic acid (H) and the water insoluble group is a higher alkylacrylamide (R). These polymers, hereinafter referred to as NVP-HRAM, when added to an aqueous brine solution have the ability to substantially increase the viscosity of the solution. The control of displacement fluid mobility results in more uniform sweep efficiency and improved oil recovery. In addition, aqueous solutions of these hydrophobically associating polymers exhibit enhanced viscosification, reduced salt sensitivity, improved thermal stability and other desirable properties found useful in chemically enhanced oil recovery processes.

2. Description of the Prior Art

The recovery of petroleum from oil-bearing formations initially involves drilling into the reservoir and utilizing the natural pressure for production. However, these primary production methods recovery only a minor portion of the oil present in the reservoir. To further improve the amount of oil recovered, a variety of techniques have been employed. These include miscible techniques, such as gas flooding; thermal methods, such as heating or steam injection; chemical methods, such as surfactant/polymer or alkaline injection; and water flooding processes. While these methods address the need to reduce oil viscosity, reduce oil-brine interfacial tension, or repressurize the formation, many deficiencies still exist which limit the amount of additional oil recovery. For example, a well-known limitation involves the poor sweep efficiency caused by the drive or displacement fluid having a higher mobility than the oil-in-place. This results in an instability manifested by viscous fingering of the drive for displacement fluid through the oil and a reduction in recovery efficiency.

It has long been known that water soluble polymers can be added to the drive water to increase viscosity or reduce mobility and thus improve the sweep efficiency and overall oil recovery. Polyacrylamide (PAM) and partially hydrolyzed polyacrylamide (HPAM) are well known water soluble polymers used as flocculation aids for waste water treatment and dewatering sludge, and for rheology control for secondary or tertiary oil recovery. Further examples of the properties and use of these polymers can be found in *Handbook of Water Soluble Gums and Resins*, R. L. Davidson, Ed., McGraw Hill 1980, Chapter 16 by H. Volk and R. E. Friedrich or in *Water-Soluble Polymers*, N. M. Bikales, Ed., Plenum Press, 1973, by D. C. MacWilliams, J. H. Rogers and T. J. West. The use of these polymers for secondary recovery of petroleum has been described by Sandiford and Keller in U.S. Pat. No. 2,827,964. Kolodny, U.S. Pat. No. 3,002,960, describes a method for preparing higher molecular weight PAM based on redox initiation. McKennon, U.S. Pat. No. 3,039,529, describes the importance of controlling the extent of hydrolysis or the amount of anionially charged carboxyl groups to minimize adsorption during secondary recovery of petroleum with these HPAM polymers. A series of improvements in HPAM polymers for secondary oil recovery are described in U.S. Pat. Nos. 3,087,543, 3,308,885, 3,721,295, 3,724,547, 3,779,316, 3,780,806, 3,893,510, and 4,034,809.

Polyacrylamides rely on a combination of high molecular weight and chain expansion due to repulsion of pendent ionic groups along the polymer chain to viscosify or thicken aqueous fluids. However, high molecular weight polymers mechanically degrade when subjected to large elongational or shear stresses such as found in pumps or during injection into reservoir rocks. This degradation results in permanent reduction in polymer molecular weight and in turn loss of viscosification efficiency. Gogarty, U.S. Pat. No. 3,580,337, suggests the use of water-soluble salts composed of divalent cations to stabilize HPAM solutions with regard to mechanical degradation. However, subsequent studies by Maerker (*Soc. Pet. Engr. J.*, 1975) indicate that the presence of divalent cations such as calcium leads to increased mechanical degradation during injection into porous media. The presence of cations in aqueous solution, in particular divalent cations, shields the ionic charged groups on the polymer. This causes the polymer chains to collapse into a random coil configuration having a smaller hydrodynamic volume, and thereby losing significant viscosification efficiency. Thus, polymeric viscosifiers based on an alternative mechanism of viscosification providing improved mechanical stability and salt tolerance relative to PAM and HPAM polymers would be highly desirable.

The use of alternate polymer structures to overcome the deficiencies in polyacrylamide systems has been explored. For example, Norton, U.S. Pat. No. 3,747,676, describes an oil recovery process using a methylolated unhydrolyzed polyacrylamide while Morduchowitz, U.S. Pat. No. 4,323,463, describes terpolymers of acrylamide, acrylonitrile and acrylic acid. In the area of anionic sulfate or sulfonate containing systems, Kaufman, U.S. Pat. No. 3,679,000, uses N-sulfohydrocarbon substituted acrylamide polymers. Hunter discloses in U.S. Pat. Nos. 4,226,730 and 4,226,731 secondary recovery processes using a water soluble ethoxylated polyphenol which is sulfated or sulfonated; and in U.S. Pat. Nos. 4,338,203 and 4,343,712 he describes copolymers of acrylamide with vinyl sulfonic acid and styrene sulfonic acid alkoxylated to various extents. None of these patents describe solution rheological properties differentiating or distinguishing these polymers from the prior act. More recently water soluble copolymers of acrylamide and sulfonated monomers have been studied as aqueous fluid viscosifiers. For example, C. L. McCormick and G. S. Chen, *J. of Polymer Science: Polymer Chemistry Ed.*, Vol. 20, 817–838 (1982) describe the synthesis and characterization of random copolymers of acrylamide and sulfonated monomers such as sodium-2-sulfoethyl methacrylate or sodium-2-acrylamido-2-methylpropane sulfonate. In a recent paper on the dilute solution properties of these polymers, H. H. Neidlinger, G. S. Chen and C. L. McCormick, *J. of Applied Polymer Science*, Vol. 29, 713–730

(1984) noted the high salt sensitivity of these polymers, particularly for copolymer compositions containing more than about 25 mole percent sulfonate monomer.

Processes for preparing polyacrylamides are well known in the art; Tanaka et al., U.S. Pat. No. 4,154,910 teaches an aqueous solution method using the heat of polymerization to concentrate the product. Zimmerman et al., U.S. Pat. No. 3,211,708 teaches an oil-in-water bead polymerization for polymerizing water soluble monomers. These techniques result in moderate molecular weight polymers exhibiting poor viscosification efficiency particularly in saline solutions. Kolodny, U.S. Pat. No. 3,002,960 teaches a low temperature, redox initiated solution polymerization resulting in high molecular weight polyacrylamide. Another approach to high molecular weight water soluble polymers is described by J. W. Vanderhoff et al., U.S. Pat. No. 3,284,393, where water soluble monomers are polymerized at high concentration in a water-in-oil emulsion. While some of these processes allow high molecular weight polymers to be prepared, the resulting PAM and HPAM systems provide only fair viscosification efficiency, poor mechanical stability and low salt tolerance.

N-vinyl pyrrolidone (NVP) homopolymers are well known and reviewed by Davidson and Sittig in *Water-Soluble Resins*. Such homopolymers are characterized by good hydrolytic stability, even in the presence of electrolytes, but poor viscosification efficiency (viscosity per unit concentration) and undersirable adsorption on rock. (H. P. Frank, *J. Polymer Sci.*, 12, 5;65 (1954); A. Conix, *J. Polymer Sci.*, 15, 221 (1955); G. A. Stahl, European Patent Application No. 84100918.6 (Jan. 30, 1984).

Copolymers of NVP with acrylamide (AM) have also been disclosed. (A. M. Chatterjee and C. M. Burns, *Canadian Journal of Chem.*, 49, 3249 (1971); G. A. Stahl, European Patent Application No. 84100918.6 (Jan. 30, 1984). Such materials have improved hydrolytic stabilities. However, the viscosification efficiency of such materials is still low.

G. A. Stahl (European Patent Application No. 84100918.6, Jan. 30, 1984) broadly teaches terpolymers of NVP, AM and minor amounts of a third monomer selected from the group of hydrophobic compounds as vinyl pyridines, hydroxylated esters of ethylenically-unsaturated carboxylic acids and N,N-alkylacrylamide, where the alky group contains more than 2 carbon atoms. (Stahl, page 23, line 15 to page 24, line 25). While these monomers are hydrophobic, some are water dispersible or even water soluble (e.g., isopropyl acrylamide) and some are water insoluble (e.g., n-octylacrylamide). Thus, the critical distinction between water soluble (dispersible) hydrophobic monomers and water insoluble hydrophobic monomers was not made. Moreover, no terpolymers containing the highly hydrophobic (insoluble) long chain N-alkylacrylamide were exemplified, possibly because of the difficulty in incorporating such monomers into homogeneous water soluble terpolymers.

One approach to overcoming the deficiencies in these polyacrylamide based systems is described by Turner et al., U.S. Pat. No. 4,520,182. Water soluble acrylamide copolymers containing a small amount of oil soluble or hydrophobic alkyl acrylamide groups were found to impart efficient viscosification to aqueous fluids. Furthermore, since these alkylacrylamide-acrylamide copolymers (RAM) were nonionic, they were relatively insensitive to the level of salt in the water. However, these polymers required concentrations above about 2000 ppm to provide significant viscosification. Landoll, U.S. Pat. No., 4,304,902 describes copolymers of ethylene oxide with long chain epoxides which also required relatively large polymer concentration (approx. 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, and required 2 to 3 weight percent polymer to provide an enhancement. The use of surfactants to enable solubility and in turn viscosification by a water soluble polymer containing hydrophobic groups is described by Evani, U.S. Pat. No. 4,432,881. The hydrophobic group claimed is attached to the polymer via an acrylate linkage which is known to have poor hydrolytic stability. In addition, the need for a surfactant to achieve solubility and thickening efficiency should make such a system very salt sensitive as well as very sensitive to small changes in surfactant and polymer concentration. Emmons et al., U.S. Pat. No. 4,395,524 teaches acrylamide copolymers as thickeners for aqueous systems. While these polymers possess hydrophobic groups, they are prepared using alcohol-containing solvents which are known chain transfer agents. The resulting polymers have rather low molecular weights and thus relatively high polymer concentrations are required to achieve reasonable viscosification of water based fluids.

One of the objects of this invention is to overcome the deficiencies in the use of the water soluble polymers of the prior art for secondary or tertiary oil recovery operations. The present invention uses a new class of water soluble polymers described by Schulz et al. in copending application U.S. Ser. No. 814,362, now U.S. Pat. No. 4,663,408 and is incorporated herein by reference. These polymers have been found to impart enhanced viscosification to aqueous fluids, improved mechanical and hydrolytic stability and better salt tolerance, characteristics highly desirable for secondary and tertiary oil recovery. These polymers contain a nonionic water soluble monomer such as acrylamide (AM), and N-vinyl pyrrolidone (NVP), an anionically charged water soluble monomer such as an alkali metal acrylate (H) and a water insoluble or hydrophobic monomer such as an alkylacrylamide (R) with a chain length of six carbons or greater. When these polymers, hereinafter referred to as NVP-HRAM tetrapolymers, are dissolved in an aqueous solvent, the hydrophobic groups aggregate or associate in a manner similar to a surfactant. This hydrophobic association between polymer chains in solution results in an increase in the effective hydrodynamic size of the molecule which in turn causes an increase in solution viscosity. The presence of ionic groups, such as sodium acrylate, cause an expansion of the polymer in solution, an improvement in polymer solubility and a favorable influence on the association of the hydrophobic groups. Thus, polymers containing both ionic acrylate groups and hydrophobic groups provide a significant improvement in viscosification efficiency of water based systems and other properties useful for secondary and tertiary oil recovery.

Synthesis of the hydrophobically associating polymers used in the secondary or tertiary oil recovery process of the instant invention presents difficulties. The incompatibility of the oil soluble and water soluble monomers prevents an effective concentration of one or the other of these monomeric species from being achieved at the locus of polymerization of the other comonomer. Techniques for polymerizing water soluble polymers such as those taught in U.S. Pat. Nos. 4,154,910, 3,211,708, 3,002,960 and 3,284,393 cannot be used to prepare the compositions of this invention. This art does not teach the formation of a sufficiently fine dispersion of the water and oil soluble monomers to enable uniform reaction and efficient aqueous viscosifiers to be prepared. The use of mutual solvents or solvent mixtures to dissolve the water and oil soluble monomers as taught by Lenke et al., U.S. Pat. No. 4,151,333 and Barua et al., U.S. Pat. No. 4,098,987 also has some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight to provide efficient aqueous viscosification. The use of water miscible solvents such as alcohols, ether and acetone either alone or with water as taught in U.S. Pat. No. 4,098,987 results in extremely low molecular weight (e.g. 10,000) polymers due to the high chain transfer characteristics of these solvents. Thus, polymers produced by these teachings are rather ineffective viscosifiers for aqueous fluids. One technique found useful for preparing the hydrophobically associating polymers used in the secondary or tertiary oil recovery process of this invention was based on dispersing the oil soluble monomers using an aqueous micellar solution of the water soluble monomers. Suitable surfactants and the details of the polymerization are taught by Bock et al. in U.S. Pat. No. 4,528,348 which is incorporated herein by reference. Using the micellar polymerization technique, there are two different routes for preparing the terpolymers of this invention. The first involved preparation of the alkylacrylamide-acrylamide, N-vinyl pyrrolidone terpolymer by the micellar polymerization followed by controlled hydrolysis of some of the acrylamide groups to anionically charged metal acrylate groups. An alternative technique involved the tetrapolymerization of acrylamide, N-vinyl pyrrolidone, alkali metal acrylate, and an N-alkylacrylamide preferably using the micellar polymerization technique. Further details of the preparation of the tetrapolymers can be found in copending application, U.S. Ser. No. 814,362, now U.S. Pat. No. 4,663,408. It is an object of this invention to improve the viscosification efficiency of brine solutions used for secondary and tertiary oil recovery and thus provide an improved process for the recovery of oil from subterranean formations. It is a further object to improve the salt tolerance, hydrolytic and mechanical stability of brine drive solutions used for mobility control during secondary and tertiary oil recovery operations. Yet another object of this invention is to provide a water soluble additive for use in rheological control during secondary and tertiary oil recovery operations.

SUMMARY OF THE INVENTION

This invention relates to a method for enhanced recovery of petroleum from a subterranean oil-bearing formation. More particularly, this invention relates to secondary or tertiary recovery of oil employing a polymer thickened aqueous drive fluid. The polymeric viscosifier for the drive fluid is selected from a class of hydrophobically associating water soluble polymers containing one or more water soluble monomers and a water insoluble monomer or group. The water soluble groups are acrylamide, N-vinyl pyrrolidone and a salt of acrylic acid and the water insoluble group is a higher alkyl acrylamide. These tetrapolymers, when dissolved in an aqueous brine solution, have the ability to substantially increase the viscosity of the solution. The control of displacement fluid mobility results in more uniform sweep efficiency and improved oil recovery. In addition, aqueous solutions of these hydrophobically associating tetrapolymers exhibit enhanced viscosification, reduced salt sensitivity and other desirable rheological properties found useful in chemically enhanced oil recovery processes.

DETAILED DESCRIPTION OF THE INVENTION

This invention relates to a process for recovering oil from a subterranean oil-bearing formation. It entails the use of an aqueous treating media which comprises an hydrophobically associating polymer of (meth)acrylamide, N-vinyl pyrrolidone, a salt of (meth)acrylic acid, and an N-alkyl(meth)acrylamide. The aqueous treating solution will generally contain some salts compatible with the reservoir fluids. The treating solution may also contain surfactants or cosurfactants to lower the interfacial tension with the resident crude oil. In addition oil may be present to compatibilize the surfactants and polymer.

The relative amounts of the monomers comprising the tetrapolymers used in the process of this invention are critically chosen to provide a balance between aqueous solubility, brine tolerance, viscosification efficiency, hydrolytic and mechanical stability. In addition, the composition of these polymers will also influence their adsorption and interaction with surfactants. The water soluble polymers used in the process of this invention are characterized by the formula:

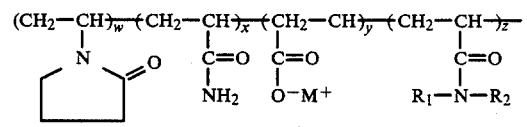

wherein $R_1$ is preferably a $C_6$ to $C_{22}$ straight chained or branched alkyl or cycloalkyl group, more preferably a $C_6$ to $C_{20}$, and most preferably about $C_6$ to $C_{18}$, and $R_2$ is the same or different alkyl group as $R_1$, or hydrogen or $C_1$ to $C_3$ straight chained or branched alkyl group; and $M^+$ is an alkali metal or ammonium cation. Typical, but nonlimiting examples of preferred alkyl groups are hexyl, octyl, decyl, dodecyl and hexadecyl groups. Typical, but nonlimiting examples of preferred cations are sodium, potassium and ammonium. The mole percentage of acrylamide, x, is preferably about 10 to about 90, more preferably about 20 to 80, and most preferably about 30 to about 70. The mole percentage of the salt of acrylic acid, y, is preferably about 2 to about 40, more preferably about 4 to about 35, and most preferably about 5 to about 25. The mole percentage of the hydrophobic group, z, is preferably about 0.1 to about 10.0, more preferably about 0.15 to about 5.0 and most preferably about 0.2 to about 3.0. The mole percentage of the N-vinyl pyrrolidone group, w, is preferably about 1 to about 80 and more preferably about 5 to about 75, and most preferably about 10 to about 70.

The molecular weight of the water soluble tetrapolymers of this invention is sufficiently high that they are efficient viscosifiers of water or brine, but not so high that the polymer molecules are readily susceptible to irreversible shear degradation. Thus, the weight average molecular weights are preferably about 200,000 to about 20 million, more preferably about 500,000 to about 15 million and most preferably about 1 million to about 10 million. The intrinsic viscosity of these polymers as measured in 2% sodium chloride solution is preferably greater than about 1 dl/g but less than about 40 dl/g.

The tetrapolymers may be synthesized by a variety of processes. The most preferred process relies on dispersing the water insoluble or hydrophobic monomer on a very fine scale into an aqueous solution of the water soluble monomer. The product is substantially free of microgel or particulates of insoluble polymer. This is achieved by dispersing the water insoluble or hydrophobic monomer into a predominantly aqueous phase containing the dissolved water soluble monomers such as acrylamide, N-vinyl pyrrolidone and acrylic acid or a salt of acrylic acid makes use of a single surfactant or mixture of surfactants with no hydrocarbon oil. In order to prevent the formation of undesirable particulates of insoluble polymer, the surfactant must be chosen to be one that is capable of solubilizing the water insoluble monomer on an extremely fine scale so that the resulting mixture is isotropic, clear and homogeneous. Thus, the solubilization of the hydrophobic monomer must take place in the micelles that form when the surfactant is dissolved into the water at concentrations above the critical micelle concentration. Further details of this polymerization technique can be found in U.S. Pat. No. 4,528,348 and copending patent application Ser. No. 814,362 which is herein incorporated by reference. The critical aspect is that the micellar reaction mixture of monomers permits a uniform polymerization to occur such that the resultant polymer does not contain particulates or lattices of water insoluble polymer.

The surfactants which may be used in the polymerization process may be one of the water soluble surfactants such as salts of alkyl sulfates, sulfonates and carboxylates or alkyl arene sulfates, sulfonates or carboxylates. Preferred are sodium or potassium salts of decyl sulfate, dodecyl sulfate or tetradecylsulfate. For these ionic surfactants, the Krafft point, which is the defined as the minimum temperature for micelle formation, must be below the temperature used for the polymerization. Thus, at the conditions of polymerization, the desired surfactant will form micelles which solubilize the water insoluble monomer.

Although NVP monomer will dissolve substantial quantities of long chain N-alkylacrylamide monomers, the addition of water and acrylamide monomer often leads to a cloudy, nonhomogeneous reaction mixture. Addition of sodium dodecylsulfate (SDS) clarifies the solution and solubilizes the hydrophobic monomer in the aqueous phase, thereby improving the process. Also the use of SDS leads to a more gel-free product as judged by visual inspection.

Polymerization of the water soluble and water insoluble monomers is effected in an aqueous micellar solution containing a suitable free radical initiator. Suitable water or oil soluble free radical initiators for the free radical terpolymerization of the acrylamide monomer, N-vinylpyrrolidone, and the N-alkylcrylamide monomer are selected from the group consisting of azo compounds, peroxides and persulfates. However, the preferred initiators are azo compounds, such as 2,2'-azobisisobutyronitrile (AIBN) (e.g., DuPont's Vazo-64®), 2,2'azobis(2-amidopropane)hydrochloride (Wako's V-50®), 2-t-butylazo-2-cyanopropane. Most preferred initiators are low temperature azo initiators, such as 2,2'azobis(2,4-dimethyl-4-methoxyvaleronitrile) (DuPont's Vazo-33®). The use of low temperature initiation and polymerization leads to higher polymer molecular weights. The concentration of the free radical initiator is about 0.001 to about 2.0 grams per 100 grams of total monomer, more preferably about 0.01 to about 1.0, and most preferably about 0.05 to about 0.1. The polymerization temperature is preferably about 10 C. to about 90 C., more preferably about 10 C. to about 70 C. and most preferably about 20 C. to about 60 C. for a period of time of about 1 to about 24 hours, more preferably about 2 to 10 hours, and most preferably about 3 to about 8 hours.

The hydrophobically associating tetrapolymers of this invention can be prepared by the micellar free radical copolymerization process which comprises the steps of forming a micellar surfactant solution of the oil soluble or hydrophobic alkyl acrylamide in an aqueous solution of acrylamide and N-vinyl pyrrolidone; deaerating this solution by purging with nitrogen or additionally applying a vacuum; adjusting the temperature to the desired reaction temperature; adding sufficient free radical initiator to the reaction solution; and polymerizing for a sufficient period of time at a sufficient temperature to effect polymerization. Base can be added to the polymerized reaction mixture to convert some of the acrylamide to acrylic acid groups. This hydrolysis reaction can be performed with a stoichiometric amount of base at a temperature of preferably about 30 C. to about 90 C., more preferably about 40 C. to about 80 C. and most preferably about 45 C. to about 70 C. for about 1 to 10 hours. Higher amounts of base can be employed to accelerate the hydrolysis which then could be run for either a shorter time or at a lower temperature. The resulting polymer of acrylamide, N-vinyl pyrrolidone, a salt of acrylic acid and a hydrophobic N-alkylacrylamide can be isolated from the reaction mixture by any of a variety of techniques which are well known to one skilled in the art. For example the polymer may be recovered by precipitation using a nonsolvent such as acetone, methanol, isopropanol or mixtures thereof. The precipiated polymer can then be washed and oven dried to provide a product in the form of a free flowing powder. Alternatively the polymer solution may be used as is by diluting with the desired aqueous solvent to the concentration of use.

An alternative method for preparing the polymers of this invention is to use acrylic acid monomer or a monovalent salt of acrylic acid such as ammonium, sodium or potassium acrylate along with acrylamide, N-vinyl pyrrolidone and the micellar dispersion of the hydrophobic N-alkyl acrylamide in the initial reaction mixture. Similar polymerization and isolation conditions could be used as described above without the need for a post hydrolysis reaction. Further details on the methods for preparing these hydrophobically associating polymers can be found in U.S. Ser. No. 814,362.

The hydrophobically associating polymers described above have been found to impart many desirable characteristics to the mobility control fluids used in the oil recovery process of the present invention. To prepare these thickened mobility control fluids, an amount of the terpolymer thickening agent is dissolved in the aqueous fluid by agitation using any of a number of techniques well known in the art. For example a marine impeller operating at relatively low speed can be used to first disperse and then dissolve these hydrophobically associating terpolymers. It is desirable to use relatively low agitation conditions since these polymers have a tendency to cause and stabilize foams which can be difficult to break. The aqueous solutions may be relatively fresh water or contain high concentrations of electrolyte such as in hard water or brine. Monovalent inorganic salts such as sodium chloride and divalent salts such as calcium or magnesium chloride or sulfate can be present in the brine in substantial amounts. A preferred method for preparing the thickened brine solutions involves first preparing a concentrated solution of the polymer in relatively fresh water and then adding a concentrated brine solution to obtain the desired final thickened brine solution. The amount of polymeric thickening agent needed to produce a desired level of viscosification will depend on the composition of the electrolytes in the aqueous reservoir fluid and the temperature of the reservoir. In general, more polymer will be required as the electrolyte concentration increases and as the temperature increases. Viscosification of about 2 to about 100 times or more that of the neat solvent can readily be achieved with the polymers used in the process of this invention. Preferably about 0.01 to about 2.0 weight percent, more preferably about 0.05 to about 1.0 weight percent and most preferably about 0.1 to about 0.5 weight percent polymer based on the aqueous medium will provide the desired level of thickening efficiency.

Molecular weight of the polymer is an important consideration. High molecular weight polymers incorporating both anionically charged acrylate groups and hydrophobic groups can provide significantly improved viscosification of water based fluids. All other things being equal, the higher the molecular weight the less soluble the polymer. Thus, as molecular weight is increased, the amount of hydrophobic groups should be reduced and the amount of acrylate groups increased. It is desirable that the resulting polymer in an aqueous solution not be susceptible to irreversible mechanical degradation under shear or elongational stress experienced during injection in reservoir formations. This places an upper limit on polymer molecular weight to minimize loss of viscosification during injection. This depends on polymer composition, injection fluid composition, injection rate and rock properties such as permeability and porosity. Control of molecular weight is achieved by adjusting polymerization conditions such as the concentration of monomers, the type and level of initiator and the reaction temperature. As is well known in the art, the molecular weight is increased by increasing the monomers level and decreasing the initiator level and reaction temperature. The use of a low temperature initiator such as the azo compound, Vazo-33 ®, provides high molecular weight polymers.

To evaluate and characterize the unique and useful properties of the hydrophobically associating polymers used in the process of this invention, dilute solution viscometric measurements were made. This measurements are particularly useful for evaluating the effect of composition and polymerization process conditions on the hydrodynamic size per unit weight of the polymer in solution and the influence of associating groups. The hydrodynamic size is measured by the intrinsic viscosity, which is related to some power of the viscosity average molecular weight. To determine the intrinsic viscosity, the reduced viscosity is first evaluated at several polymer concentrations in the dilute regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at sufficiently low polymer concentrations. The intercept of this reduced viscosity plot at zero polymer concentration is defined as the intrinsic viscosity while the slope is the Huggin's interaction coefficient times the square of the intrinsic viscosity. The Huggins' constant is a measure of polymer-solvent interactions. For hydrophobically associating polymers, it is characteristically greater than the 0.3 to 0.7 value normally observed for nonassociating polymers such as polyacrylamides.

Measurements of the dilute solution viscosity were made with conventional Couette or capillary viscometers. A set of Ubbelohde capillary viscometers were used in this study. Shear rate effects were found to be negligible in the concentration range of interest. However, since the polymers contain anionically charged groups, a polyelectrolyte effect was observed in dilute solution. The addition of salts such as sodium chloride or sodium sulphate shields the charge repulsion causing the polyelectrolyte effect and resulted in the desired linear reduced viscosity vs concentration plot. The dilute solution measurements were thus made on solutions containing 2.0 weight percent sodium chloride.

The solution viscosity of associating polymers in the semi-dilute concentration regime is dramatically different than conventional water soluble polymers. Viscosities of these solutions were measured by means of a Contraves low shear viscometer, model LS 30, using a No. 1 cup and No. 1 bob. Temperatures were controlled to $\pm 0.1$ C. and measurements were made at a variety of rotational speeds corresponding to shear rates from about $1.0 \text{ sec}^{-1}$ to about $100 \text{ sec}^{-1}$. In contrast to conventional water soluble polymers and relatively low molecular weight weakly associating polymers, the polymers of this invention can exhibit significant relaxation times which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations.

An important property of polymers used in secondary or tertiary processes for additional petroleum recovery is the viscosity retention of the polymer solution. Mechanical degradation of polymer solutions is caused by the high shear or elongational stress the polymer molecules experience during injection into reservoir rock. The resultant permanent loss in viscosity is a result of a reduction in the polymer molecular weight. This, in turn, decreases the sweep efficiency of the polymer solution within the reservoir resulting in decreased petroleum recovery. Partially hydrolyzed polyacrylamide is known to mechanically degrade depending on the polymer molecular weight, polymer composition, mixing and injection rates, and the reservoir rock porosity and permeability.

Equally important, a polymer solution must be expected to withstand harsh environmental conditions, such as, elevated temperatures for weeks or months and perhaps (depends on field size) several years. It is well known that polyacrylamides have a limited lifetime at elevated temperatures due to thermally promoted hydrolysis. Hydrolysis is undesirable because it can lead to viscosity changes and, phase separation (precipitation) of the polymer by divalent cations, such as, calcium and magnesium ions present in the reservoir. The resultant loss in viscosity gives a simultaneous loss of mobility control which decreases the sweep efficiency of the polymer solution in a reservoir.

It is an object of this invention to overcome loss of viscosity, by thermal or mechanical means, of water soluble polymers of the prior art used in secondary or tertiary oil recovery processes. It is a further object to improve the salt tolerance and viscosification efficiency of brine drive solutions used for mobility control during secondary or tertiary petroleum recovery processes. Yet another object of this invention is to provide a water soluble additive for use in rheological control during secondary or tertiary oil recovery operations. Thus, this invention relates to a method to improve the process for the recovery of petroleum from a subterranean oil-bearing formation.

DESCRIPTION OF THE PREFERRED EMBODIMENTS

The following examples illustrate the present invention without, however, limiting the same hereto.

EXAMPLES 1-8

SYNTHESIS OF NVP-HRAM Tetrapolymers

An NVP-RAM terpolymer of acrylamide, NVP, and N-n-octyl acrylamide was synthesized using the micellar polymerization technique. A 1 liter resin flask was equipped with a condensor, thermometer, stirrer (electric) and nitrogen inlet and outlet. Acrylamide (17.47 g), N-octylacrylamide (0.65 g), and NVP (11.88 g) in 470 g water were polymerized with 0.123 g AIBN (Vazo-64®) in the presence of 1.7 g sodium dodecyl sulfate (SDS) at 45 C. for 18 hours. This corresponds to a $[M]/[I]^{\frac{1}{2}}=60$ (monomer to initiator ratio) and total solids content of 6% in water. Although NVP helps solubilize octylacrylamides, the SDS further homogenizes and clarifies the reaction mixture. The resulting polymer solution was a soluble gel. It was passed through a meat grinder and diluted further with water to a 1% concentration. The polymer solution was precipitated in 6 liters of acetone. Copolymers with various ratios of $C_8$ hydrophobe were prepared and their composition is given in Table I, and their viscometrics compared in Table II, Examples 1 to 4. The viscosification efficiency of the copolymers compared with the composition containing no hydrophobe (Example 1) is clearly evident. Five gram quantities of the solid polymers were dissolved in 500 cc of water and heated to 60 C. to facilitate dissolution. They were then cooled to 40 C. and mixed with a solution of NaOH (0.55 g/300 g water) for 18 hours. Tetrapolymers with about 7% hydrolysis and various ratios of $C_8$ hydrophobe were prepared. Their compositions are given in Table I and viscometrics compared in Table II, Examples 5 to 6. The NVP-HRAM tetrapolymers are superior viscosifiers compared with a NVP-HPAM system containing no hydrophobe, Example 5, and to NVP-RAM containing no salt of acrylic acid, Example 1.

EXAMPLES 9-16

Synthesis of NVP-HRAM Tetrapolymers (Low Temperature)

A series of NVP-HRAM tetrapolymers consisting of 69.25 mole % acrylamide, and 30 mole % NVP, and 0.75 mole % N-n-octylacrylamide were prepared using the recipe and procedures described in Examples 1 through 8, with the exception of initiator type and reaction temperature. The low temperature initiator employed was Vazo-33® at polymerization temperatures between 20 and 30 C. Different hydrolysis reaction conditions were used to prepare the tetrapolymers with levels of anionically charged sodium acrylate groups ranging from about 5 to 10 mole %. Prior studies had indicated that hydrolysis was very slow at 40 C. and thus temperature for hydrolysis was performed at 55 C. The degree of hydrolysis is a monotonic increasing function of the amount of added base and thus is the major variable for controlling the charge content in the tetrapolymer. These polymers were shown to be efficient brine viscosifiers with even better solution quality/clarity than the polymers prepared in Examples 1 to 8. The composition of the resulting NVP-HRAM tetrapolymers are also given in Table 1 with the mole percent sodium acrylate determined by titration and sodium analysis. The solution viscometrics of these tetrapolymers are shown in Table III where modest amounts of shear thickening is also exhibited.

EXAMPLE 17

Hydrolytic Stability Under Basic Conditions

The rate of base ($OH^-$) catalyzed hydrolysis of NVP-RAM terpolymers compared to NVP/AM copolymers and PAM (polyacrylamide homopolymer) at 40 C. is shown in Table IV. Surprisingly, the NVP-RAM polymers with varying amounts of $C_8$ (0.5–1.0% $C_8$) show less hydrolysis than both RAM and PAM polymers known in the art as shown in Table IV. Base catalyzed hydrolysis is both a means of converting terpolymers to tetrapolymers and a measure of the hydrolytic stability of the hydrophobically associating tetrapolymers.

EXAMPLE 18

Hydrolytic Stability Under Neutral Conditions

Polymer solutions were prepared containing 0.2 wt.% polymer in a 3.5% NaCl brine solution. Samples of these solutions were aged at constant elevated temperatures. Periodically, samples were withdrawn for measurement of the extent of conversion of acrylamide to acrylate functionality via hydrolysis. The method for the determination of the degree of hydrolysis consisted of: 1. dialysis to remove or reduce the concentration of extraneous salt; 2. treatment of the dialyzate with cation and anion exchange resins to remove all extraneous salt and convert carboxylate groups on the hydrolyzed polymer to carboxylic acid groups; 3. gravimetric determination of the polymer concentration in the ion exchange resin-treated solution and 4. titration of the ion exchange resin-treated solution to determine acid content.

As can be seen from the results presented in Table V, hydrolytic stability of acrylamide based polymers was significantly improved by the incorporation of the NVP monomer. In addition, resistance to hydrolysis increased as the NVP monomer content increased as shown by the reduced level of hydrolysis with time for an NVP/AM copolymer with 52 mole % NVP, Example 16, as compared to Example 15.

EXAMPLE 19

Solution Viscometrics

Polymer solutions were prepared by the slow addition of a weighed polymer sample to rapidly stirred purified water obtained from a millipore water system. Upon complete polymer addition, stirring was decreased and dissolution was allowed to progress for about 24 hours or until solutions were homogeneous and clear. For characterization in 2% NaCl, a concentrated NaCl solution was used, which, when added in proper amounts gives the 2% brine and desired polymer concentration. For characterization in a final brine solution containing divalent cations, a concentrated brine solution comprised of NaCl and $CaCl_2$ was used. When added in proper amounts, the final desired brine solution was a mixture of 3% NaCl and 0.3% $CaCl_2$, designated as 3.3%, also giving the desired polymer concentration, typically 1500 ppm.

Viscosities of these solutions were measured by means of a Contraves Low Shear 30 Rheometer, using a No. 1 bob and cup. Temperatures were controlled to ±0.1 C. and measurements were made at a variety of rotational speeds from about 1.0 to 100. $s^{-1}$. Intrinsic viscosities were determined using capillary viscometers at 25 C. Measurements were made at different polymer concentrations to obtain 5 solutions with viscosities from 1.1 to 2.0 times the 2% NaCl solvent viscosity. Plots of the reduced viscosity versus polymer concentration were analyzed with the following equation:

$$\eta_{red} = [\eta] + k_h[\eta]^2 c$$

to yield the intrinsic viscosity and Huggins' interaction coefficient, $k_h$, as shown in Tables II and III. The intrinsic viscosity is a function of polymer molecular weight, amount of charged anionic acrylate groups and hydrophobic groups. The influence of hydrophobic association and NVP incorporation on the solution rheological properties is shown in Tables III and IV. The solution viscosities were measured on solutions containing 1500 ppm polymer in 3.3% brine at several shear rates including 1.3 and 11 $sec^{-1}$ which typifies the range of shear rates encounted in porous media at frontal advance rates of about 1 ft/day. 10 sec.$^{-1}$.

The presence of the hydrophobic group, N-n-octylacrylamide, has increased the viscosity significantly as compared to a non hydrophobic system (Examples 1 and 15). These pronounced enhancements in solution viscosity are due to changes in solubility and hydrophobic associations and have little to do with molecular weight. This is indicated by similar values of the intrinsic viscosity, which is a measure of molecular weight. The presence of associations is evidenced by the increase in the Huggins' coefficient from about 0.4 for nonassociating to about 4., for the associating tetrapolymers. A higher Huggins' coefficient indicates that the solution viscosity will increase faster with polymer concentration.

EXAMPLE 20

Salt Sensitivity

One of the major deficiencies of aqueous viscosifiers based on polymers containing ionic groups is the salt sensitivity of the viscosity. To assess this sensitivity, the viscosity of a polymer solution in distilled water was divided by the viscosity of the same solution containing salt to give a viscosity ratio. Solutions at a polymer concentration of 2000 ppm and several salt contents (i.e. 0 to 1.0, and 2.0% NaCl) were prepared and their viscosity determined at two shear rates (i.e. 1.3 and 11.0 $sec^{-1}$). As shown by the data in Table VI, all of these variables have an effect on the viscosity ratio. In general, the NVP-HRAM tetrapolymer of this invention, illustrated by Example 14, is significantly less sensitive than a commericial HPAM polymer system to the salt content of the solution. The NVP-HPAM system, Example 15, without the hydrophobe and the commerical HPAM are more salt sensitive than the NVP-HRAM tetrapolymer. Thus, it is evident that the hydrophobe incorporation reduces the salt sensistivity. For example, comparing these polymers at 2000 ppm, 1.3 $sec^{-1}$ shear rate and 2.0% NaCl, the viscosity ratio is 7 and 23 for the NVP-HRAM tetrapolymer and corresponding HPAM copolymer respectively. This indicates that at these conditions, the HPAM polymer is approximately three times as salt sensitive as the NVP-HRAM copolymer. At a salt concentration of 1 and 2% the NVP-HRAM tetrapolymer showed a further decrease in salt sensitivity, as demonstrated by the viscosity ratio, at 11. $sec^{-1}$ as compared to the 1.3 $sec^{-1}$ shear rate. This was a result of an increase in the solution viscosity. This could be of significant benefit in applications where one desires a fixed viscosity level tolerant of variation in salt content.

EXAMPLE 21

Mechanical Stability

The mechanical stability of the NVP tetrapolymer system, Example 14, along with a partially hydrolyzed polyacrylamide system was monitored by determining the viscosity of the effluent polymer solution after passage through Berea sandstone having a nominal porosity of 0.2. Fresh polymer solution of 1500 ppm concentration in 3.3% brine was pumped through a 0.5" diameter Berea sandstone disk by means of a dual piston constant flow rate pump. The disk had a nominal length of 0.5" and permeability under one darcy for the systems studied. The disk was cut to the above dimensions from a Berea sandstone rod, which was epoxy coated to prevent fluid loss from the disk sides during the flow process. Cutting of the Berea disk was accomplished with a diamond saw blade using 3.3% brine as the cutting fluid. The disk was briefly sonnicated to remove sandstone fines from the disk faces followed by vacuum drying. Subsequently, the disk was placed into a stainless steel holder equipped to measure the pressure drop across the disk by means of calibrated pressure transducers. The permeability was determined by flowing the 3.3% brine solvent, measuring the pressure drop, flow rate, and using Darcy's Law, $$Q = \frac{KA\Delta P}{\eta L}$$

where Q=flow rate, cc/sec, K=permeability, darcies, A=disk area, cm², η=fluid viscosity, cP, L=disk length, cm, and ΔP=pressure drop, atmospheres. Polymer solution was then injected using various flow rates, and the extent of mechanical degradation was monitored by measuring the effluent viscosity by the Contraves Low Shear Rheometer at shear rates of 1.3 and 11.0 sec.$^{-1}$. The higher shear rate, 11.0 sec$^{-1}$, typifies flux (flow) of 1 ft/day of the polymer fluid through the reservoir.

As shown in Table VII, the mechanical stability of the NVP tetrapolymer, Example 14, was superior to that of a commercial partially hydrolyzed polyacrylamide (HPAM). Prior to the mechanical degradation studies, the NVP tetrapolymer and HPAM system had similar solution viscosities at the 1.3 and 11.0 sec$^{-1}$. However, the NVP-HRAM system, containing 30 mole% NVP and 0.75 mole% hydrophobe, maintained 50% of its original viscosity up to a flux of about 675 ft/day. In contrast, the HPAM system maintained only 50% of original viscosity up to about 50 ft/day flux. The increase in viscosity retention for the NVP-HRAM system represents a significant improvement in mechanical stability as compared to the hydroyzed polyacrylamide.

EXAMPLE 22

Resistance Factor

In conjunction with monitoring the mechanical stability of the NVP-HRAM polymer system, Example 14, the polymer resistance factor was determined. The brine polymer resistance factor is a comparison of the brine solvent and polymer solution mobilities (Mp) calculated by;

$$R = M_w/M_p = (K_w/\eta_w)/(K_p/\eta_p)$$

where the subscripts w and p refer to water (or brine) and polymer solution. In an oil bearing formation, oil typically has a higher viscosity than the water phase, therefore, to improve the recovery of oil, the mobility ratio needs to be increased. This is accomplished by increasing the driving fluid (polymer solution) viscosity, which would increase the polymer resistance factor. As shown in Table VIII, the resistance factor for the NVP-HRAM polymer system, Example 14, shows a pseudoplastic behavior with increasing flux up to about 90 ft/day, where a more newtonian resistance factor behavior is evident, up to the fluxes examined. In comparison with a commercial HPAM system, the resistance factor is significantly lower at low flux and reaches a plateau at about 10 ft/day flux, where a pseudoplastic response begins and continues to the highest fluxes studied. At the typical flux of 1 ft/day in a reservoir, the higher resistance factor for the NVP-HRAM polymer indicates an improvement in sweep efficiency which can lead to a more efficient oil recovery process. Thus, less polymer is needed to achieve comparable mobility control.

The information provided by these examples illustrate the unique viscosity enhancing characteristics of the hydrophobically associating NVP-HRAM tetrapolymers of this invention. These polymers viscosify at lower polymer concentrations, and give improved salt tolerance, properties desirable for secondary and tertiary petroleum recovery.

TABLE I

NVP-HRAM TETRAPOLYMERS

| Example No. | Initiator Type | SDS Conc. Wt. % | Rx Temp. C. | NVP mole % | C8AM mole % | COONa mole % |
|---|---|---|---|---|---|---|
| 1 | Vazo-64 | 0.3 | 45 | 30 | — | — |
| 2 | Vazo-64 | 0.3 | 45 | 30 | 0.5 | — |
| 3 | Vazo-64 | 0.3 | 45 | 30 | 0.75 | — |
| 4 | Vazo-64 | 0.3 | 45 | 30 | 1.0 | — |
| 5 | Vazo-64 | 0.3 | 45 | 30 | — | 7.0 |
| 6 | Vazo-64 | 0.3 | 45 | 30 | 0.5 | 6.7 |
| 7 | Vazo-64 | 0.3 | 45 | 30 | 0.75 | 6.7 |
| 8 | Vazo-64 | 0.3 | 45 | 30 | 1.0 | 6.9 |
| 9 | Vazo-33 | 1.0 | 30 | 30 | 0.75 | — |
| 10 | Vazo-33 | 1.0 | 24 | 30 | 0.75 | 7.7 |
| 11 | Vazo-33 | 1.0 | 20 | 30 | 0.75 | 8.5 |
| 12 | Vazo-33 | 1.0 | 24 | 30 | 0.75 | 5.6 |
| 13 | Vazo-33 | 1.0 | 20 | 30 | 0.75 | 9.6 |
| 14 | Vazo-33 | 1.0 | 20 | 30 | 0.75 | 9.2 |
| 15 | Vazo-33 | 1.0 | 20 | 30 | — | 9.3 |
| 16 | Vazo-33 | 1.0 | 20 | 52 | — | — |

TABLE II

Solution Properties of NVP-HRAM Tetrapolymers Prepared with Vazo-64 (High Temperature)

| Example No. | C8AM mole % | COONa mole % | Viscosity, cP(1) 1.3 s$^{-1}$ | Viscosity, cP(1) 11 s$^{-1}$ | Int. Visc.(2) dl/g | Huggins' Coef. |
|---|---|---|---|---|---|---|
| 1 | — | — | 3.1 | — | 7.0 | 1.1 |
| 2 | 0.5 | — | 5.3 | — | — | — |
| 3 | 0.75 | — | 6.8 | — | — | — |
| 4 | 1.0 | — | 17.5 | — | — | — |
| 5 | — | 7.0 | 3.5 | 3.5 | 12.3 | 0.4 |
| 6 | 0.5 | 6.7 | 6.7 | 5.1 | 8.2 | 3.0 |
| 7 | 0.75 | 6.7 | 11.2 | — | 11.6 | 1.4 |
| 8 | 1.0 | 6.9 | 600–1267 | — | 8.1 | 3.7 |

TABLE III

Solution Properties of NVP-HRAM Tetrapolymers Prepared with Vazo-33 (Low Temperature)

| Example No. | Rx Temp. C | C8AM mole % | COONa mole % | Viscosity, cP(1) 1.3 s$^{-1}$ | Viscosity, cP(1) 11 s$^{-1}$ | Viscosity, cP(1) 69 s$^{-1}$ | Int. Visc.(2) dl/g | Huggins' Coef. |
|---|---|---|---|---|---|---|---|---|
| 9 | 30 | 0.75 | — | 9.5 | 8.9 | 10.8 | — | — |
| 10 | 24 | 0.75 | 7.7 | 20.0 | 25.0 | 44.0 | — | — |
| 11 | 20 | 0.75 | 8.5 | 16.7 | 22.7 | 33.0 | — | — |
| 12 | 24 | 0.75 | 5.6 | 10.7 | 9.6 | 13.8 | — | — |
| 13 | 20 | 0.75 | 9.6 | 16.8 | 17.4 | 29.0 | — | — |
| 14 | 20 | 0.75 | 9.2 | 16.3 | 14.0 | 22.0 | 6.4 | 3.2 |
| 15 | 20 | — | 9.3 | 4.5 | 4.7 | 4.4 | 10.7 | 0.4 |

NVP Level at 30 mole %.
(1)Polymer concentration at 1500 ppm in 3.3% brine.
(2)Intrinsic viscosity in 2% NaCl.

TABLE IV

Hydrolysis Rate vs Time For NVP Terpolymers(1)

| Polymer Type | Hydrolysis Time, Hrs. | % Hydrolysis m. % Acrylic Acid |
|---|---|---|
| Polyacrylamide | 3 | 22.0 |
| | 6 | 22.5 |
| | 12 | 24.0 |
| RAM (1 m. % C8AM) | 3 | 14.0 |
| | 6 | 15.5 |
| | 12 | 17.0 |
| NVP-RAM (1 m. % C8AM) | 3 | 6.9 |
| | 6 | 6.4 |
| | 12 | 7.4 |

(1)At 40 C, Ratio of moles of NaOH/moles of Polymer = ½.

TABLE V

Hydrolytic Stability of NVP-AM Copolymers(1)

| Example No. | NVP mole % | Time Days | Hydrolysis Increase mole % Acrylic Acid 80C | 93C |
|---|---|---|---|---|
| Polyacrylamide | 0 | 20 | — | 24. |
| | | 40 | — | 45. |
| | | 60 | — | 62. |
| | | 100 | — | 78. |
| 15 | 30 | 20 | 5. | 12. |
| | | 40 | 7. | 15. |
| | | 60 | 10. | 17. |
| | | 100 | 13. | 23. |
| 16 | 52 | 20 | — | 2. |
| | | 40 | — | 4. |
| | | 60 | — | 5. |
| | | 100 | — | 5. |

(1)2000 ppm, 3.5% NaCl

TABLE VI

Effect of Salt Concentration On NVP-HRAM Solution Viscometrics

| Example No. | Polymer Conc., ppm | Salt Level % NaCl | Viscosity Ratio(1) $1.3\ s^{-1}$ | $11\ s^{-1}$ |
|---|---|---|---|---|
| 14 | 2000 | 0.01 | 2. | 1.5 |
| | 2000 | 0.10 | 5. | 3. |
| | 2000 | 1.0 | 7. | 2. |
| | 2000 | 2.0 | 7. | 1.5 |
| 15 | 2000 | 0.01 | 2. | 2. |
| | 2000 | 0.10 | 11. | 6. |
| | 2000 | 1.0 | 17. | 16. |
| | 2000 | 2.0 | 36. | 18. |
| Commercial HPAM | 2000 | 0.5 | 10. | 5. |
| | 2000 | 1.0 | 16. | 7. |
| | 2000 | 2.0 | 23. | 9. |

(1)The viscosity of the polymer solution divided by the viscosity of the polymer in salt water.

TABLE VII

Mechanical Stability Properties of NVP-HRAM Tetrapolymer

| Example No. | Flux FT/Day | Viscosity, cP $1.3\ s^{-1}$ | $11\ s^{-1}$ |
|---|---|---|---|
| 14 | 1.8 | 14.3 | 13.0 |
| | 4.6 | 12.4 | 11.5 |
| | 9.3 | 13.1 | 11.4 |
| | 13.9 | 12.6 | 11.1 |
| | 18.6 | 12.9 | 10.8 |
| | 47.1 | 13.7 | 11.1 |
| | 93.5 | 13.4 | 10.8 |
| | 140.0 | 13.2 | 11.1 |
| | 170.5 | 12.1 | 11.3 |
| | 339.3 | 12.2 | 10.6 |
| | 674.0 | 9.7 | 8.8 |
| | 825.0 | 9.7 | 8.4 |
| | 1018.0 | 8.3 | 7.7 |
| Commercial HPAM | 1.9 | | 15. |
| | 4.9 | | 15. |
| | 10.0 | | 14. |
| | 29.9 | | 11. |
| | 51.0 | | 8. |
| | 77.0 | | 7. |
| | 149.0 | | 5. |
| | 384.0 | | 4. |
| | 683.0 | | 3. |
| | 982.0 | | 3. |

1500 ppm, 3.3% brine.

TABLE VIII

Resistance Factor of NVP-HRAM Tetrapolymer

| Example No. | Flux FT/Day | Resistance Factor |
|---|---|---|
| 14 | 1.8 | 1039. |
| | 4.6 | 436. |
| | 9.3 | 213. |
| | 13.9 | 121. |
| | 18.6 | 88. |
| | 47.1 | 46. |
| | 93.5 | 36. |
| | 140.0 | 34. |
| | 170.5 | 32. |
| | 339.3 | 38. |
| | 674.0 | 36. |
| | 825.0 | 35. |
| | 1018.0 | 33. |
| Commercial HPAM | 1.9 | 70. |
| | 3.1 | 124. |
| | 4.9 | 213. |
| | 10.0 | 264. |
| | 13.0 | 241. |
| | 29.9 | 210. |
| | 51.0 | 155. |
| | 77.0 | 120. |
| | 149.0 | 79. |
| | 384.0 | 45. |
| | 683.0 | 32. |
| | 982.0 | 27. |

1500 ppm, 3.3% brine

What is claimed is:

1. A water flooding process for the secondary recovery of oil from a production well comprising injecting an aqueous solution under pressure to force oil to the production well, said aqueous solution comprising:
   (a) water; and
   (b) about 100 to about 5,000 ppms of a water soluble polymer having the formula:

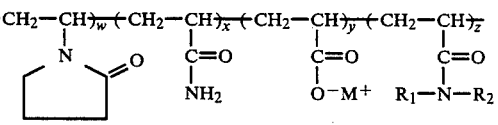

wherein $R_1$ is a $C_6$ to $C_{22}$ straight chained or branched alkyl or alkylcycloalkyl group; $R_2$ is hydrogen or a $C_6$ to $C_{22}$ straight chained or branched alkyl or ycloalkyl group or a $C_1$ to $C_3$ straight chained or branched alkyl group; and $M^+$ is an alkali metal or ammonium cation, wherein x is about 10 to 90 mole percent, y is about 2 to about 40 mole percent, z is about 0.1 to about 10.0 mole percent, and w is about 1 to about 80 mole %.

2. A process according to claim 1 wherein $M^+$ is a sodium cation.

3. A process according to claim 1 wherein $R_1$ is an octyl group.

4. A process according to claim 1 wherein $R_1$ is a dodecyl group.

5. A process according to claim 1 wherein $R_1$ is a decyl group.

6. A process for recovering oil from a production well comprising injecting an aqueous solution under pressure to force oil to the production well, said aqueous solution comprising:

(a) water;

(b) about 0.1 to 5.0 weight percent of a surfactant; and (c) about 100 to about 5,000 ppms of a water soluble polymer having the formula:

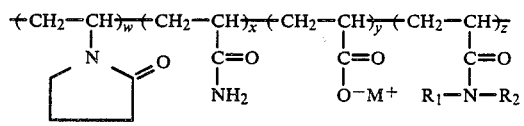

wherein $R_1$ is a $C_6$ to $C_{22}$ straight chained or branched alkyl or alkylcycloalkyl group; $R_2$ is hydrogen or a $C_6$ to $C_{22}$ straight chained or branched alkyl or cycloalkyl group or a $C_1$ to $C_3$ straight chained or branched alkyl group; and $M^+$ is an alkali metal or ammonium cation, wherein x is about 10 to 90 mole percent, y is about 2 to about 40 mole percent, z is about 0.1 to about 10.0 mole percent, and w is about 1 to about 80 mole %.

7. A process according to claim 6 wherein $M^+$ is a sodium cation.

8. A process according to claim 6 wherein $R_1$ is an octyl group.

9. A process according to claim 6 wherein $R_1$ is a dodecyl group.

10. A process according to claim 6 wherein $R_1$ is a decyl group.

* * * * *